United States Patent Office 2,915,547
Patented Dec. 1, 1959

2,915,547

2-CARBAMYL-PHENYL PHOSPHORIC ACID AND SALTS THEREOF

Frank Ratcliffe Atherton, Welwyn Garden City, England, assignor to Hoffmann-La Roche Inc., Nutley, N.J., a corporation of New Jersey No Drawing. Application August 20, 1956
Serial No. 605,234

Claims priority, application Great Britain August 30, 1955

2 Claims. (Cl. 260—461)

The present invention is concerned with a novel phosphate and salts thereof and the manufacture of same.

The novel phosphate provided by the invention may be formulated thus:

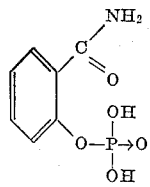

that is to say it is 2-carbamyl-phenyl phosphoric acid. The salts provided by the invention are the sodium, magnesium and calcium salts of this phosphate.

The novel phosphate formulated herein is more soluble than salicylamide and is preferred in salicylamide therapy. The novel phosphate may also be administered in the form of its sodium, magnesium or calcium salt (also provided by the invention). The magnesium and calcium salts are readily decomposed by the stomach acid and release the free phosphate.

The novel phosphate of the invention and the said salts may be manufactured by phosphorylating salicylamide with tetrabenzyl pyrophosphate in the presence of an alkali-metal alkoxide, catalytically hydrogenating off the benzyl groups of the dibenzyl 2-carbamyl-phenyl phosphate so formed and, if desired, converting the latter into its sodium or magnesium or calcium salt by treatment with the appropriate alkali-metal or alkaline-earth-metal hydroxide.

The following example illustrates how the novel phosphate may be prepared:

EXAMPLE (a) *Dibenzyl 2-carbamyl-phenyl phosphate*

Salicylamide (21.55 g. 0.15 M) was added to a solution of potassium t-butoxide in t-butanol (154.5 ml. of 0.971 N≡0.15 M). A solution of tetrabenzyl pyrophosphate (80.8 g. 0.15 M) in benzene (400 ml.) was added in one portion and the mixture was stirred at ca. 20° C. for 6 hours and then set aside for 17 hours.

The solid was filtered off and washed with benzene. The filtrate was evaporated in vacuo and the combined residue and the solid were partitioned between chloroform (200 ml.) and water (100 ml.). The separated solvent phase was washed successively with water (2×50 ml.), dilute sodium hydroxide (2 N, 2×50 ml.) and water (2×50 ml.). The solution was dried over sodium sulphate and then evaporated in vacuo to dryness, leaving a solid residue which was triturated with petrol and filtered. This crude product weighed 45.1 g. and melted at 88–92° C. Recrystallization from carbon tetrachloride gave pure dibenzyl 2-carbamyl-phenyl phosphate (34.7 g.) of melting point 102–104° C.

(b) *2-carbamyl-phenyl phosphoric acid*

Dibenzyl 2-carbamyl-phenyl phosphate (19.85 g. 0.05 M) was dissolved in ethanol (200 ml.) and hydrogenolyzed using a pre-reduced catalyst prepared by hydrogenation of Adams palladium oxide (0.5 g.) and palladium charcoal (0.5 g.) in ethanol (50 ml.). When uptake of hydrogen ceased, the catalyst was filtered off and washed with ethanol. The filtrate was evaporated in vacuo and the residue dissolved in ethanol (10 ml.) and treated with benzene (50 ml.) when crystallization rapidly commenced. After some time, more benzene (50 ml.) was added and the mixture kept for 15 hours. The separated product was then filtered off, washed with benzene and petrol and air-dried. The 2-carbamyl-phenyl phosphoric acid so obtained (10.62 g.≡98% yield) had a melting point of 150°–151° C. Recrystallization was effected by dissolving in boiling methanol (60 ml.) and adding benzene (300 ml.) and the pure material (9.1 g.), melting point 155–156° C., was obtained.

I claim:

1. A compound selected from the group consisting of 2-carbamyl-phenyl-phosphoric acid and the sodium, magnesium and calcium salt thereof.

2. 2-carbamyl-phenyl-phosphoric acid.

References Cited in the file of this patent

UNITED STATES PATENTS 2,320,588    Graenacher et al. _____ June 1, 1943

OTHER REFERENCES

Cherbuliez et al.: "Helv. Chim. Acta," 39, pp. 1461–7, July 15, 1956.